United States Patent [19]

Marquardt et al.

[11] 4,211,729

[45] Jul. 8, 1980

[54] COMPOSITIONS CONTAINING DIORGANOPOLYSILOXANES

[75] Inventors: Klaus Marquardt, Krailling; Franz-Heinrich Kreuzer, Munich, both of Fed. Rep. of Germany

[73] Assignee: Consortium fur Elektrochemische Industrie, GmbH, Munich, Fed. Rep. of Germany

[21] Appl. No.: 827,502

[22] Filed: Aug. 25, 1977

[30] Foreign Application Priority Data

Sep. 14, 1976 [DE] Fed. Rep. of Germany ....... 2641201

[51] Int. Cl.² .............................................. C08L 43/04
[52] U.S. Cl. .................................... 525/106; 528/26; 528/32; 528/42; 528/43; 528/901; 260/31.8 S; 260/37 SB
[58] Field of Search .............. 260/827, 46.5 G, 46.5 E

[56] References Cited

U.S. PATENT DOCUMENTS

| | | | |
|---|---|---|---|
| 2,965,593 | 12/1960 | Dietz | 260/17 A |
| 3,580,971 | 5/1971 | Getson | 260/18 S |
| 3,627,836 | 12/1971 | Getson | 260/23 R |
| 3,631,087 | 12/1971 | Lewis et al. | 260/23 R |
| 3,776,875 | 12/1973 | Getson | 260/33.6 SB |
| 3,979,356 | 9/1976 | Walters | 260/827 |
| 4,026,853 | 5/1977 | Dressnandt et al. | 260/18 S |

FOREIGN PATENT DOCUMENTS

| | | |
|---|---|---|
| 2116837 | 10/1971 | Fed. Rep. of Germany . |
| 2459806 | 3/1975 | Fed. Rep. of Germany . |
| 1161072 | 8/1969 | United Kingdom . |
| 1261484 | 1/1972 | United Kingdom . |
| 222664 | 5/1968 | U.S.S.R. . |

*Primary Examiner*—Melvyn I. Marquis

[57] ABSTRACT

A composition containing diorganopolysiloxanes and copolymers prepared in the presence of these diorganopolysiloxanes in which the copolymers are derived from monomers consisting of at least ethylene and vinyl acetate. The resulting composition exhibits non-slump properties and does not migrate on vertical surfaces even in the absence of fillers.

13 Claims, No Drawings

COMPOSITIONS CONTAINING DIORGANOPOLYSILOXANES

BACKGROUND OF THE INVENTION

This invention relates to diorganopolysiloxane compositions and more particularly to compositions containing diorganopolysiloxanes and copolymers which are prepared in the presence of the diorganopolysiloxanes.

More specifically the invention relates to diorganopolysiloxane compositions containing copolymers which are derived from monomers consisting of at least ethylene and vinyl acetate and to a process for preparing the diorganopolysiloxane compositions.

Compositions containing diorganopolysiloxanes and a polymer which is prepared in the presence of the diorganopolysiloxanes have been known heretofore. For example, it has been known that monomers containing aliphatic unsaturation can be polymerized in the presence of diorganopolysiloxanes and free radical initiators. In U.S. Pat. No. 4,026,853 several patents are disclosed which describe the preparation of modified organopolysiloxanes by polymerizing monomers containing aliphatic unsaturation in the presence of organopolysiloxanes and free radical initiators. This patent also discloses a large number of monomers containing aliphatic unsaturation, including ethylene and vinyl acetate which may be employed in the polymerization. However, the preparation of ethylene and vinyl acetate copolymers in the presence of diorganopolysiloxanes has not been known heretofore.

Compositions prepared heretofore from the polymerization of monomers containing aliphatic unsaturation in the presence of diorganopolysiloxanes and free radical initiators have several disadvantages. For example, these compositions migrate on vertical or inclined surfaces and flow out of vertical fissures. In order to overcome these disadvantages, it was necessary to add fillers such as described in U.S. Pat. No. 3,580,971. Also, U.S. Pat. No. 3,776,875 discloses that polymerization compositions prepared in the presence of solvents are thixotropic and will not migrate on vertical surfaces. One of the disadvantages of adding fillers is that they may produce an undesirably high viscosity or lead to solidification of the compounds. In addition, incorporation of fillers into the compositions substantially increases the cost of the products. Likewise, compositions obtained from the polymerization of methacrylic acid in the presence of diorganopolysiloxanes must contain an undesirably high percentage of diorganopolysiloxane, otherwise they will have an undesirably high viscosity. Moreover, when a solvent is employed in the polymerization, the resultant products, when molded, have a tendency to shrink as the solvent evaporates. In contrast to the compositions described heretofore, the compositions of this invention exhibit non-slump properties in the absence of fillers or polymethacrylic acids. Moreover, it is no longer essential that the compositions be prepared in the presence of solvents in order to obtain the desired non-slump properties. Likewise, these compositions are non-slump in the absence of other materials, except cross-linking agents.

Therefore, it is an object of this invention to provide organopolysiloxane compositions. Another object of this invention is to provide compositions containing diorganopolysiloxanes and copolymers derived from monomers consisting of at least ethylene and vinyl acetate. Still another object of this invention is to provide compositions in which the copolymers are bonded to and/or dispersed in the diorganopolysiloxane. A further object of this invention is to provide organopolysiloxane compositions which will not migrate on the surface even in the absence of fillers. A still further object of this invention is to provide a process for preparing diorganopolysiloxane compositions having copolymers bonded to and/or dispersed in the diorganopolysiloxanes in which the copolymers derived from monomers consisting of at least ethylene and vinyl acetate are prepared in the presence of diorganopolysiloxanes and free radical initiators.

SUMMARY OF THE INVENTION

The foregoing objects and others which will become apparent from the following description are accomplished in accordance with this invention, generally speaking, by providing an organopolysiloxane composition containing diorganopolysiloxane and copolymers derived from monomers consisting of at least ethylene and vinyl acetate, in which the copolymers are bonded to and/or dispersed in the diorganopolysiloxanes. The organopolysiloxane composition contains from 30 to 40 percent by weight of units derived from ethylene, from 56.5 to 70 percent by weight of units derived from vinyl acetate and from 0 to 3.5 percent by weight of units derived from a monomer other than ethylene and vinyl acetate which is capable of being polymerized in the presence of a free radical initiator based on the weight of copolymer and diorganopolysiloxane. The composition is prepared by polymerizing at least two monomers consisting of vinyl acetate and ethylene in the presence of a diorganopolysiloxane and a free radical initiator at a temperature of from 30° to 70° C. In the polymerization reaction, the vinyl acetate is present in an amount of from 55 to 75 percent by weight based on the weight of the vinyl acetate and the diorganopolysiloxane, and the vinyl acetate and diorganopolysiloxane constitute up to about 60 percent by volume of the polymerization vessel and the ethylene is employed at a pressure of from 40 to 70 bar.

DETAILED DESCRIPTION

The diorganopolysiloxanes which are employed in the process of this invention and in whose presence vinyl acetate and ethylene copolymers as well as possibly an additional monomer are prepared, are preferably those represented by the general formula

$$Z_nSiR_{3-n}O(SiR_2O)_xSiR_{3-n}Z_n$$

in which R represents the same or different monovalent hydrocarbon radicals or substituted monovalent hydrocarbon radicals, Z represents hydroxyl groups and/or hydrolyzable groups and/or hydrolyzable atoms, n is 0, 1, 2 or 3 and X is 0 or an integer having a value of at least 1.

It is preferred that the R radicals contain from 1 to 7 carbon atoms. Examples of suitable hydrocarbon radicals represented by R are alkyl radicals, such as methyl, ethyl, propyl, butyl, and hexyl radicals; cycloalkyl radicals, such as the cyclohexyl radical and aryl radicals such as the phenyl and tolyl radicals. It is preferred that alkenyl radicals such as the vinyl radical or allyl radical be present only in the terminal units.

Substituted hydrocarbon radicals represented by R are generally halogenated hydrocarbon radicals or cyanoalkyl radicals. Examples of substituted hydrocarbon radicals are the 3,3,3-trifluoropropyl radical, chlorophenyl radicals and beta-cyanoethyl radical. Because they are more readily available, it is preferred that at least 80 percent of the R radicals be methyl radicals.

The hydrolyzable groups represented by Z can be the same hydrolyzable groups as are present in the hydrolyzable silicon compounds which are generally employed in the preparation of compounds which can be stored under anhydrous conditions, but when exposed to moisture at room temperature, cure to an elastomeric solid. Examples of suitable hydrolyzable groups are acyloxy groups (—OOCR'), hydrocarbonoxy and substituted hydrocarbonoxy groups (—OR'), hydrocarbonoxy-hydrocarbonoxy groups (—OR"OR'), where R" is a divalent or substituted divalent hydrocarbon radical, such as the ethylene radical, aminoxy groups (—ONR'$_2$), amino groups, for example —NR'$_2$, acylamino groups, for example —NR'COR', oxime groups (—ON=CR'$_2$) and phosphate groups

[—OP(OR')$_2$].

In these formulas, R' represents the same or different monovalent or substituted monovalent hydrocarbon radicals and hydrogen atoms. Examples of hydrocarbon radicals represented by R, are equally applicable for hydrocarbon radicals R' and examples of substituted hydrocarbon radicals represented by R, are equally applicable for substituted hydrocarbon radicals R'.

Examples of acyloxy groups are especially acyloxy groups having from 1 to 18 carbon atoms, such as formyloxy, acetoxy, propionyloxy, valeroyloxy, caproyloxy, myristoyloxy and stearoyloxy groups.

Examples of hydrocarbonoxy groups are alkoxy groups having from 1 to 10 carbon atoms, such as methoxy, ethoxy, n-propoxy, isopropoxy, butoxy, hexyloxy, heptyloxy and octyloxy groups. Other examples of hydrocarbonoxy groups having from 1 to 10 carbon atoms are vinyloxy, allyloxy, ethylallyloxy, isopropenyloxy, butadienyloxy and phenoxy groups.

The best known example of a hydrocarbonoxy-hydrocarbonoxy group is the methoxyethyleneoxy group. Examples of aminoxy groups are dimethylaminoxy, diethylaminoxy, dipropylaminoxy, dibutylaminoxy, dioctylaminoxy, diphenylaminoxy, ethylmethylaminoxy and methylphenylaminoxy groups.

Examples of amino groups are n-butylamino, sec.-butylamino and cyclohexylamino groups.

An example of an acylamino group is the benzoylmethylamino group.

Examples of oxime groups are acetophenonoxime, acetonoxime, benzophenonoxime, 2-butanonoxime, diisopropylketoxime and chlorocyclohexanonoxime groups.

Examples of phosphate groups are dimethylphosphate, diethylphosphate, dibutylphosphate, dioctylphosphate, methylethylphosphate, methylphenylphosphate and diphenylphosphate groups.

Examples of hydrolyzable Z atoms are halogen atoms, such as chlorine atoms as well as hydrogen atoms.

It is preferred that Z represent hydroxyl groups and that n have a value of 1. However, if one of the R radicals in the two terminal units is a vinyl group, or if each of the R radicals is a methyl group, then n has a value of 0.

The value of X can be 20,000 or even higher, so long as the diorganopolyxiloxanes are still flowable, even in the presence of solvents.

Although this is not indicated in the following formula, $Z_n SiR_{3-n}O(SiR_2O)_x SiR_{3-n}Z_n$, where R, Z, n and x are the same as above, small amounts of siloxane units other than diorganosiloxane units may be present within the siloxane chain. Such other units are often present only as impurities and not usually in amounts exceeding about 10 mol percent. The ratio of the number of R radicals to the number of Si-atoms preferably ranges from about 1.9 up to about 2.25.

The diorganopolysiloxanes employed in accordance with this invention and the diorganopolysiloxanes which are present in the compositions of this invention can be homopolymers or copolymers. Examples of preferred diorganopolysiloxanes are dimethylpolysiloxanes and copolymers consisting of dimethylpolysiloxane units and methylphenylsiloxane units and/or diphenylsiloxane units, in which the polymers or copolymers are terminated with Si-bonded hydroxyl groups.

The diorganopolysiloxanes used in the process of this invention and the diorganopolysiloxanes present in the resultant compositions can, however contain some diorganopolysiloxanes which are not covered by the previously cited formula. An example of such a diorganopolysiloxane which may be present is octamethylcyclotetrasiloxane.

Moreover, up to 50 percent by weight, and more preferably up to about 20 percent by weight of the diorganopolysiloxanes used in the process of this invention can be of a type which is linked by chemical bonding to organic polymers other than organopolysiloxanes, i.e., graft polymers and/or block-copolymers. Diorganopolysiloxanes which are linked by chemical bonding to organic polymers other than organopolysiloxanes and which constitute graft polymers, have organopolysiloxane chains as the principal chains or "backbones" and at least one side chain which consists of an organic polymer other than an organopolysiloxane. In the block-copolymers in which diorganopolysiloxanes are linked by chemical bonding to organic polymers other than organopolysiloxanes, the blocks or segments which consist of diorganopolysiloxane units alternate with blocks or segments of an organic polymer other than the diorganopolysiloxane. The principal organopolysiloxane chains or "backbones" may be illustrated by the above general formula if at least one of the R radicals is a bivalent, or substituted bivalent hydrocarbon radical to which a polymeric organic radical other than an organopolysiloxane radical is bonded thereto with the provision that x is at least 20. Furthermore, the blocks or segments made up of diorganopolysiloxane units may also contain units of the general formula:

—(SiR$_2$O)$_{x'}$SiR$_2$—, where R is the same as above and x' is an integer having a value of at least 1, and more preferably having a value of at least 20. When the diorganopolysiloxanes are chemically linked to the organic polymers, they are generally linked through an SiC or an SiOC linkage.

The organic polymers which are chemically linked to the diorganopolysiloxanes can be polymerization products, polycondensation products or polyaddition products. Examples of organic polycondensation products other than organopolysiloxanes or of polyaddition products or of polymerization products are polyester, polyether, polyurethane and polymers containing aliphatic unsaturation in which the organic polymers are chemically linked to the diorganopolysiloxanes. These compositions are generally known and procedures for their preparation are described in German Patent Specification 15 95 531 to Dow Corning Corporation. Other patents which describe the preparation of compositions in which the organic polymers are chemically linked and/or dispersed in the diorganopolysiloxanes are U.S. Pat. Nos. 3,555,109; 3,776,875; 3,627,836 and 3,631,087. Compositions and methods for preparing compositions in which the organic polymers are chemically linked to and/or dispersed in the diorganopolysiloxanes are disclosed in German Patent Specification Nos. 20 38 519; 21 16 837 to General Electric Company; U.S.S.R. Certificate 222,664; U.S. Pat. No. 2,965,593; British Pat. No. 1,261,484 to Dow Corning Corporation and German Patent Specification No. 24 59 806 to General Electric Company.

It is preferred that each organic polymer which is chemically bonded to a cross-linked diorganopolysiloxane contain at least 20 polymer units in the chain for each side chain or segment. Furthermore it is preferred that the diorganopolysiloxanes which are linked with organic polymers by a chemical bond, be generated only during the preparation of the composition of this invention, i.e., that the organic polymers which are linked with the diorganopolysiloxane by chemical bonding contain recurring units which are derived from vinyl acetate, ethylene and possibly one other monomer which is polymerizable in the presence of free radicals and that they be linked to the diorganopolysiloxane by SiC bonding.

It is assumed that the polymerization of the vinyl acetate and ethylene and possibly at least one other monomer in the presence of the diorganopolysiloxanes and a free radical initiator produce a stable dispersion in which the resultant copolymer is bonded to and/or dispersed in the diorganopolysiloxanes.

The organopolysiloxanes employed in the process of this invention are preferably liquids which can be stirred at the polymerization temperature. It is preferred that their average viscosity be from about 100 to 1000 cP at 25° C.

Although only one type of diorganopolysiloxane can be used, mixtures consisting of several diorganopolysiloxanes may be employed.

It is preferred that the vinyl acetate be employed in amounts of from 65 to 70 percent by weight based on the total weight of the diorganopolysiloxane and the vinyl acetate. It is also preferred that the pressure of the ethylene be on the order of from 50 to 60 bar.

In the process of this invention, 5 percent by weight based on the weight of the vinyl acetate employed may consist of monomers other than ethylene and vinyl acetate which can be polymerized in the presence of free radicals.

Examples of other monomers which can be polymerized in the presence of free radicals with the ethylene and vinyl acetate, are polymerizable aliphatic hydrocarbons such as propylene and butylene; vinyl halides such as vinyl fluoride and vinyl chloride; vinyl esters of organic acids such as vinyl propionate and vinyl laurate; styrene, substituted styrenes, as well as other aromatic vinyl compounds and heterocyclic vinyl compounds, such as vinyl naphthalene and vinyl pyridine; acrylic acids and acrylic acid derivates, such as acrylic acid salts, esters and amides; as well as acrylonitrile, N-vinyl compounds, such as N-vinylcarbazole, N-vinylpyrrolidone and N-vinyl caprolactam; vinyl groups which contain silanes such as vinyltriethoxysilane; symmetrically di-substituted ethylenes, such as vinylene carbonate and stilbene, as well as asymmetrically disubstituted ethylenes, such as vinylidene cyanide, methacrylic acid and methacrylic acid derivatives, such as methacrylic acid salts, esters and amides; as well as methacrylonitrile and methacrolein and allyl compounds such as allyl chloride, allylesters and allyl amides of organic aids.

It is preferred that organic peroxides be employed to initiate the formation of free radicals. However other compounds can be used as well; for example azo compounds, in which the two nitrogen atoms of the azo group are bonded to tertiary carbon atoms and where the unsaturated valences of the tertiary carbon atoms are saturated by nitrile, carboxyl, cycloalkylene or alkyl groups, preferably having from 1 to 10 carbon atoms. Also, free radicals can be generated by means of high energy rays, such as alpha, beta or gamma rays or UV-rays.

Examples of preferred free radical forming compounds are diacylperoxides, such as benzoylperoxide and lauroylperoxide, ketoperoxides such as acetone peroxide and cyclohexanone peroxide; hydrocarbon hydroperoxides, such as tert-butyl hydroperoxide, cumene hydroperoxide and decahydronaphthalene hydroperoxide; dialkyl peroxides, such as di-tert-butyl peroxide and dicumyl peroxide; perketals such as 1,1,-di-tert-butyl peroxy-3,3,5-trimethylcyclohexane; peresters such as tert-butyl perbenzoate; tert-butyl peroxyisopropyl carbonate, tert-butylperpivalate, tert-butyl peroctoate, tert-butylcyclohexyl percarbonate and tert-butyl permaleinate and acetylcyclohexanesulfonyl peroxide.

Mixtures of these free radical forming compounds may also be used in the process of this invention.

It is preferred that the high energy rays be used in such an amount that no more than $10^{-2}$ mol radicals per hour are formed for each liter of reaction mixture and more preferably no more than $5 \times 10^{-4}$ mol radicals per liter per hour of reaction mixture. The free radical initiator is preferably used in amount of from 0.005 to 5 percent by weight and more preferably, in amounts of from 0.003 to 2 percent by weight based on the total weight of the vinyl acetate and the diorganopolysiloxane employed.

Preferably the reaction is conducted at a temperature of from 45° to 55° C. However, temperatures of from about 30° to about 100° C. may be employed if desired. Although compounds may be employed to control the molecular weight, it is preferred that the reaction be conducted in the absence of these compounds. It is preferred that the reaction be conducted in the absence of solvents, however, relatively small amounts of solvent may be employed to obtain a homogeneous distribution of the free radical initiators among the reactants. Nevertheless, the use of solvents, especially in an amount up to about 20 percent by weight based on the total weight of the vinyl acetate and the diorganopolysiloxane used in the process of this invention should by no means be excluded. When solvents are used, it is preferred that solvents having the lowest possible chain transfer constant be employed. Examples of such solvents are aliphatic hydrocarbons, such as hexane or benzene mixtures; esters, such as methyl acetate and/or ethyl acetate and/or alcohols, such as tert-butanol.

The copolymers consisting of vinyl acetate, ethylene and if desired at least one monomer which can be polymerized by means of free radical initiators, are generally present in the form of minute spheres and/or irregular structures having a diameter of 0.1 to 100 μm. The formation of these particles is not dependent on the method or type of stirring.

In addition to the copolymer consisting of vinyl acetate, ethylene and if desired at least one other monomer which can be polymerized in the presence of free radical initiators, the diorganopolysiloxane in whose presence the copolymer is prepared and possibly diorganopolysiloxane which is linked by chemical bonding to an organic polymer other than organopolysiloxane, as well as solvents, the compositions of this invention may contain or be mixed with other substances such as diorganopolysiloxanes of the formula:

$$Z_nSiR_{3-n}O(SiR_2O)_xSiR_{3-n}Z_n$$

where R, Z, n and x are the same as above except that n has a value of 0 or one of the R radicals in the two terminal units is a vinyl group and n has a value of 0. These substances may be employed in an amount in excess of 35 percent by weight based on the total weight of the copolymer consisting of at least vinyl acetate, ethylene and one other monomer when present and the diorganopolysiloxane, and up to 99 percent by weight, based on the total weight of the flowable, composition including fillers, cross-linking agents, cross-linking catalysts, pigments, heat stabilizers, antioxidants, ultraviolet absorbers, emollients and cell-generating compounds such as azodicarbonamide, as well as bituminous materials.

Fillers which may be included in these compositions are reinforcing fillers, i.e., fillers having a surface area of at least 50 m²/gm. Examples of suitable fillers are precipitated silicon dioxide having a surface area of at least 50 m²/gm and/or pyrogenically produced silicon dioxide.

A portion of the fillers can be non-reinforced fillers, i.e., fillers which have a surface area of less than 50 m²/gm. Examples of non-reinforced fillers or pigments are diatomaceous earth, bentonite, quartz meal, crystobalite meal, pigment grade titanium dioxide, ferric oxide and zinc oxide. Fibrous fillers such as asbestos and glass fibers may also be incorporated in the compositions of this invention. The fillers may for example be treated with trimethylethoxysilane in a ball mill to coat the surfaces with organosiloxy groups. However, it is preferred that reinforcing fillers be omitted from these composition. When reinforcing fillers are employed however, it is preferred that they be present in an amount less than about 50 percent by weight based on the total weight of the fillers and all other components.

Suitable examples of emollients are phthalic, adipic, sebacic, citric or phosphoric acid esters having from 1 to 30 carbon atoms per molecule of aliphatic or aromatic alcohols. Individual examples of such emollients are dioctyl and didecylphthalate, dioctyl and didecyladipate, dioctyl sebacate, trioctylcitrate, tricresyl phosphate and trixylenylphosphate. The use of emollients which are either entirely immiscible with the diorganopolysiloxane or only just slightly miscible with the diorganopolysiloxane is preferred, since these emollients surprisingly do not decrease the stability of the compositions of this invention. When an emollient is employed, it is preferably employed in an amount less than about 25 percent by weight based on the total weight of the emollient and the other components. When the compositions of this invention contain emollients, they are especially suited for the sealing of fissures which are subject to stress as the result of expansion.

Even when the compositions of this invention do not contain organopolysiloxanes having hydrolyzable groups or hydrolyzable atoms or crosslinking agents and possibly crosslinking catalysts, they constitute valuable coating agents for electronic devices or lubricants or components of lubricants which are superior to the pastes known heretofore which consist of trimethylsiloxy endblocked dimethylpolysiloxanes and silicon dioxide having a surface area of at least 50 m²/gm.

When the organopolysiloxanes in the compositions of this invention contain at least three hydrolyzable groups and/or hydrolyzable atoms per molecule, these compositions can be stored under anhydrous conditions, but when exposed to moisture at room temperature, they crosslink to form elastomers. The moisture present in normal atmospheric air is sufficient to cause these compositions to crosslink.

When the organopolysiloxanes present in the compositions of this invention have two Si-bonded hydroxyl groups per molecule, these compositions can be crosslinked at room temperature to form elastomers by the addition of crosslinking agents which contain at least three condensable groups and/or condensable atoms per molecule, and condensation catalysts when desired.

The addition of the crosslinking agents containing at least 3 condensable groups and/or condensable atoms per molecule and condensation catalysts when desired, provides a composition which must be molded more or less immediately following the addition of the crosslinking agents and catalysts. These compositions constitute the so called "two-component systems". Also, crosslinking agents and catalysts when desired may be used to prepare compositions which can be stored under anhydrous conditions and which cure spontaneously to form elastomers, when exposedl to atmospheric moisture at room temperature. These compositions constitute the so called "one-component systems".

One-component systems can be prepared under anhydrous conditions, by mixing the compositions of this invention which contain diorganopolysiloxanes having two Si-bonded hydroxyl groups, with polyfunctional silicon compounds having at least 3 hydrolyzable groups per molecule, and condensation catalysts, if desired, Examples of such polyfunctional silicon compounds are methyltriacetoxysilane, tetraacetoxysilane, methyl-tert-butoxyacetoxysilicon compounds having a total of three tert-butoxy and acetoxy groups per molecule, methyltris(cyclohexylamino)-silane, methyltris-(sec-butylamino)silane, isopropoxytriacetoxysilane, methyltris-(2-butanonoximo)silane, methyltris-(diethylphosphato)-silane and methyltris-(isopropylamino)-silane, as well as methyltris-(diethylaminoxy)-silane.

Two component systems can be prepared by mixing the compositions of this invention containing organopolysiloxanes having two Si-bonded hydroxyl groups per molecule, with crosslinking agents and condensation catalysts. Examples of suitable crosslinking agents are silanes of the formula:

where R is the same as above, Z' is a hydrocarbon radical or a hydrocarbon radical containing an ether oxygen atom, and n' is 0 or 1, or siloxanes which are liquid at room temperature and which contain at least three SiOZ' groups and/or at least three Si-bonded hydrogen atoms per molecule, and the silicon atoms not linked to siloxane oxygen atoms, —OZ' groups and hydrogen atoms are satisfied by R groups.

Suitable examples of crosslinking agents which may be employed in the preparation of two-component systems are methyltriethoxysilane, tetraethoxysilane, "ethylsilicate 40", i.e., an ethylpolysilicate having an $SiO_2$ content of approximately 40 percent by weight, isopropylpolysilicates, methylbutoxydiethoxysilane, methyltris (methyloxyethyleneoxy)-silane and methylhydrogenpolysiloxanes.

In the preparation of the one-component and two-component systems, the polyfunctional silicon compounds are generally used in amounts of from 0.5 to 20 percent by weight and more preferably from 1 to 10 percent by weight based on the weight of the organopolysiloxanes.

Examples of suitable condensation catalysts are metal carboxylic acid salts or organometal carboxylic acid salts of metals selected from lead to manganese of the electrochemical series, (cf. Handbook by Chemistry and Physics, 31 Ed., Cleveland, Ohio, 1949, page 1465). Examples of preferred catalysts are tin compounds such as dibutyltin dilaurate, dibutyltin diacetate, tin-II-octoate, a mixture of dibutyltin diacylates, where the acylate group is derived from carboxylic acids having from 9 to 11 carbon atoms per molecule and the carboxyl group in at least 90 percent by weight of the acids is bonded to a tertiary carbon atom; dibutyltin dioctoate, distannoxanes, such as diacetoxytetrabutyl distannoxane and dioleoyltetramethyl distannoxane. Other catalysts are ferric octoate, lead octoate, lead laurate and cobalt-naphthenate; titanium esters, such as tetrabutyl titanate; amines such as n-hexylamine; amine salts such as n-hexylamine hydrochloride and n-butylamino acetate.

When one or two-component systems are prepared, the condensation catysts are generally employed in an amount of from 0.2 to 10 percent by weight based on the weight of the organopolysiloxanes.

Crosslinking can be accelerated by applying heat or where the compounds are crosslinked by water, then water in addition to that contained in the atmosphere or carbon dioxide may be added.

When the diorganopolysiloxanes contained in the compositions of this invention have aliphatically unsaturated terminal groups bonded to silicon via carbon, then they can be crosslinked by the addition of organopolysiloxanes which contain at least three Si-bonded hydrogen atoms per molecule and catalysts which promote the addition of Si-bonded hydrogen or aliphatic multiple bonds at room temperature or at elevated temperatures, generally not in excess of about 100° C.

A preferred example of organopolysiloxanes containing at least three Si-bonded hydrogen atoms per molecule which may be used for crosslinking organopolysiloxanes having aliphatically unsaturated groups bonded to silicon via carbon, is methylhydrogenpolysiloxane.

Organopolysiloxanes containing at least three Si-bonded hydrogen atoms per molecule which are used for crosslinking organopolysiloxanes having groups which contain aliphatically unsaturated groups that are linked to silicon via carbon are preferably employed in an amount of from 0.5 to 20 percent by weight and more preferably in an amount of from 1 to 10 percent by weight based on the weight of the organopolysiloxanes.

Examples of catalysts which promote the addition of Si-bonded hydrogen to aliphatic multiple bonds are platinum, platinum supported catalysts such as platinum on silicon dioxide or activated charcoal and platinum compounds such as chloroplatinic acid as well as the products or complexes obtained from the reaction of chloroplatinic acid and organic and silicon organic compounds and/or inorganic compounds. The reaction products or complexes can be free of inorganic halogen. Specific examples are reaction products of chloroplatinic acid and ketones, such as cyclohexanone and platinum complexes in which platinum is chemically bonded to 1,3-divinyltetramethyldisiloxane. Platinum and platinum compounds, including the reaction products and complexes, are preferably employed in amounts of from 0.5 to 500 ppm (parts by weight per million parts by weight), calculated as Pt based on the weight of the organopolysiloxanes. Other examples of catalysts which promote the addition of Si-bonded hydrogen to aliphatic multiple bonds are rhodium compounds and rhodium complexes, iridium compounds and iridium complexes as well as cobalt and manganese carbonyls.

Regardless of whether or not the organopolysiloxanes used in the compositions of this invention contain aliphatically unsaturated groups, Si-bonded hydroxyl groups or hydrolyzable groups and/or hydrolyzable atoms, the compositions of this invention and/or the compositions prepared in accordance with the process of this invention can be crosslinked by means of free radicals formed by the conventional techniques. Thus, crosslinking can be carried out in the presence of the free radical-forming chemical and non-chemical medium mentioned heretofore.

In order to facilitate the dispersion of the crosslinking agents and/or crosslinking catalysts in the compositions, the crosslinking agents and/or the crosslinking catalysts can be dissolved or dispersed in a solvent which is inert with respect to the crosslinking agent or the catalysts employed. Examples of suitable solvents or dispersing agents are organopolysiloxanes, such as dimethylpolysiloxanes having trimethylsiloxy terminal groups, and organic solvents which evaporate at room temperature. Examples of suitable organic solvents are chlorinated hydrocarbons such as trichloroethylene. When organic solvents or chlorinated organic solvents are employed, they are preferably employed in an amount of less than about 20 percent by weight based on the weight of the composition to be crosslinked.

The compositions of this invention contain up to about 35 percent by weight of diorganopolysiloxanes based on the total weight of the copolymer which comprises vinyl acetate, ethylene and possibly one other monomer and the diorganopolysiloxanes. The compositions of this invention, can be employed in the preparation of molds, including those used for the manufacture of articifial teeth, concrete and furniture elements, gaskets, electrical insulation items, including coatings for electrical conduits and cable terminal closures, maritime coatings, roof coatings, hydrophobic coatings on poured concrete and brickwork, paper and textile coatings, embedding of electrical and electronic devices and for filling fissures and cavities. Due to their consistency and their non-slump properties these compositions are especially suited for the coating of vertical or steep surfaces, for the filling or sealing of vertical or steep fissures and for the molding of vertical or steep planes.

Various embodiments of this invention are illustrated in the following examples in which all parts are by weight, unless otherwise specified.

EXAMPLE 1

A mixture containing 150 kg of a dimethylpolysiloxane having an Si-bonded hydroxyl group in each of its terminal units and which has a viscosity of 500 cP at 25° C., 278 kg vinyl acetate and 1 kg of tert-butylcyclohexylpercarbonate is heated in a 2 m$^3$ polymerization reactor. The mixture is stirred with an anchor stirrer for 10 hours at the rate of 50 to 100 rpm, under an ethylene pressure of 60 bar, with the temperature maintained at 47° C. The unreacted ethylene and vinyl acetate is removed and the resultant product contains 28 percent by weight of dimethylsiloxane units, 50 percent by weight of vinyl acetate derived units and 22 percent by weight of ethylene derived units, based on the weight of the composition. The resultant product is a paste and exhibits nonslump properties.

EXAMPLE 2

A mixture of consisting of 187.5 gms of a diorganopolysiloxane having a viscosity of 620 cP at 25° C. and having an Si-bonded hydroxyl group in each of its terminal units, 312.5 gms of vinyl acetate and 1.5 gms of tert-butylcyclohexylpercarbonate is heated in a 1-liter polymerization reactor to a temperature of 45° C. over a period of 22 hours, while being stirred with an anchor stirrer at 300 rpm under an ethylene pressure of 40 bar. Following removal of unreacted ethylene and vinyl acetate, a product is obtained which contains 33 percent by weight of dimethylpolysiloxane units, 53 percent by weight of vinyl acetate derived units and 14 percent by weight of ethylene derived units, based on the weight of the composition. The resultant product is of a paste-like consistency and exhibits non-slump propertires.

EXAMPLE 3

A mixture consisting of 2.13 kg of a dimethylpolysiloxane having a viscosity of 420 cP at 25° C. and an Si-bonded hydroxyl group in each of its terminal units, 3.95 kg vinyl acetate, 0.9 kg of ethyl acetate and 11 grams of a mixture containing 75 percent by weight of tert-butylperpivalate and 25 percent by weight of aliphatic hydrocarbons which are liquid at room temperature, is heated to a temperature of 55° C. in a 16-liter polymerization reactor over a period of 7 hours while being stirred at the rate of 100 to 300 rpm under an ethylene pressure of 60 bar. Thereafter 7 grams of tert-butylperpivalate, dissolved in 100 milliliters of ethyl acetate, are added to the polymerization reactor and heated at 55° C. while being stirred at 100 to 300 rpm, for an additional 8 hours under an ethylene pressure of 60 bar. After removing the unreacted ethylene and the volatile components at 12 mm Hg (abs.), the resultant composition contains 27 percent by weight of dimethylpolysiloxane units, 51.2 percent by weight vinyl acetate derived units, and 22.8 percent by weight of ethylene derived units. The resultant paste-like product shows non-slump properties.

EXAMPLE 4

About 300 grams of the product prepared in accordance with the procedure described in Example 1 are mixed under anhydrous conditions with 15 grams of methyltris-(chchlohexylamino)-silane. The resultant composition is physically stable and when applied as a 1 mm thick coating on a vertical surface, it cures at room temperature in atmospheric moisture to form a 1 mm thick uniform coating. The thickness of the coating is uniform since none of the substance migrated prior to curing. Elastomers made from this composition have a tensile strength of 3.5 Megapa and an elongation of 500 percent. The non-slump properties are determined in accordance with the procedure described in DIN 52,454.

EXAMPLE 5

About 100 grams of the product prepared in accordance with the procedure described in Example 1 are mixed under anhydrous conditions with 6.25 grams of methyltris-(cyclohexylamino)-silane and 25 grams of dioctyl phthalate. The resultant composition is physically stable and when exposed to atmospheric moisture at room temperature, cures to an elastomeric solid having at an elongation of 100 percent a tensile modulus of 1.8 MegaPa. The non-slump properties are determined in accordance with the procedure described in DIN 52,454.

EXAMPLE 6

About 100 grams of the product prepared in accordance with the procedure described in Example 1 are mixed with 3 grams of tetraethoxysilane and 0.6 gram of tin-II-octoate. The non-slump properties are determined in accordance with the procedure described in DIN 52,454. The composition is placed on a vertical stone surface as a 0.5 cm thick coating. After about one hour, the composition cured to an elastomeric solid. It is then removed from the irregular stone surface and the resultant coating is a negative pattern of the irregular stone surface.

EXAMPLE 7

About 100 grams of the product prepared in accordance with the procedure described in Example 2 are mixed with 11.6 grams of a hydroxyl terminated dimethylpolysiloxane having a viscosity of 500 cP at 25° C. The resultant mixture has a viscosity of 16,000 cP at 25° C. and may be poured due to the increase in the proportion of dimethylsiloxane units.

COMPARISON EXAMPLES (a) to (f)

(a) A mixture consisting of 4.04 kg of a hydroxyl-terminated diorganopolysiloxane, 5.2 kg of styrene, 4.2 kg of n-butylacrylate, 0.8 kg of water and 0.141 kg of 1,1-di-tert-butylperoxy-3,3,5-trimethylcyclohexane is heated to 100° C. for 7 hours under nitrogen in a 30-liter polymerization vessel equipped with a reflux condenser and an anchor stirrer rotating at 200 rpm. After removing the unreacted monomers and water, the resultant liquid product contains 30 percent by weight of dimethylpolysiloxane units, 31.5 percent by weight of n-butylacrylate derived units and 38.5 percent by weight of styrene derived units.

(b) The product prepared in accordance with Example (a) above, is mixed with 1 gram of pyrogenically produced silicon dioxide having a surface area of approximately 200 m²/gm and 5 grams of methyltris-(cyclohexylamino)-silane. The resultant product is a liquid.

(c) The procedure described in Example (b) above is repeated, except that 2 grams of pyrogenically produced silicon dioxide having a surface area of approximately 200 m²/gm is used. The resultant liquid product solidifies after storing for 24 hours in a closed container.

(d) The procedure described in Example (b) is repeated, except that 4 grams of pyrogenically produced silicon dioxide having a surface area of approximately 200 m²/gm is used. The resultant product solidifies as soon as the silicon dioxide is added.

(e) The procedure described in Example (d) is repeated, except that 5 grams of methyltris-(sec.-butylamino)-silane is substituted for 5 grams of methyltris-(cyclohexylamino)-silane. Again, solidification occurs as soon as the silicon dioxide is added.

(f) The procedure described in Example (b) is repeated, except that 10 grams of quartz meal is substituted for 1 gram of the pyrogenically produced silicon dioxide. The resultant mixture is a liquid.

What is claimed is:

1. A composition containing a diorganopolysiloxane and a copolymer derived from monomers consisting of at least ethylene and vinyl acetate in which the copolymer consists of from 30 to 40 percent by weight of units derived from ethylene, from 56.5 to 70 percent by weight of units derived from vinyl acetate and from 0 to 3.5 percent by weight of units derived from a monomer other than ethylene and vinyl acetate which is capable of being polymerized in the presence of a free radical initiator, said copolymer is prepared in the presence of the diorganopolysiloxane and is present in the composition in an amount of from 65 to 85 percent by weight based on the weight of the copolymer and the diorganopolysiloxane.

2. The composition of claim 1, wherein the diorganopolysiloxane is represented by the formula:

$$Z_n SiR_{3-n}O(SiR_2O)_x SiR_{3-n}Z_n$$

in which R is selected from the class consisting of monovalent hydrocarbon radicals, halogenated monovalent hydrocarbon radicals and cyanoalkyl radicals, Z is selected from the class consisting of hydroxyl groups, hydrolyzable groups and hydrolyzable atoms, n is 0, 1, 2 or 3 and x is 0 or an integer of at least 1.

3. The composition of claim 2, wherein Z represents a hydrolyzable group.

4. The composition of claim 3, wherein Z is selected from the class consisting of acyloxy, hydrocarbonoxy, substituted hydrocarbonoxy, hydrocarbonoxyhydrocarbonoxy, aminoxy, amino, acylamino, oxime and phosphate groups.

5. The composition of claim 2 wherein Z represents hydroxyl groups.

6. The composition of claim 2 wherein one of the R radicals on each of the terminal silicon atoms is a vinyl group and n is 0.

7. A room temperature curable composition which is stored under anhydrous conditions and when exposed to atmospheric moisture cures to an elastomeric solid comprising the composition of claim 5 and further contains a silicon compound having at least three hydrolyzable groups per molecule.

8. The composition of claim 7, wherein the composition contains a condensation catalyst.

9. A room temperature curable composition comprising the composition of claim 5 and a crosslinking agent selected from the class consisting of silanes of the formula $$R_{n'} Si(OZ')_{4-n'}$$

and siloxanes, said siloxanes are liquid at room temperature and contain at least three SiOZ' groups and the remaining silicon atoms on the siloxanes which are not linked to siloxane oxygen atoms, OZ' groups or hydrogen atoms are satisified by R groups and a condensation catalyst, in which R is selected from the class consisting of monovalent hydrocarbon radicals, halogenated monovalent hydrocarbon radicals and cyanoalkyl radicals, Z' is selected from the class consisting of a hydrocarbon radical and a hydrocarbon radical containing an ether oxygen atom and n' is 0 or 1.

10. A curable composition comprising the composition of claim 6 and an organopolysiloxane which contains at least three Si-bonded hydrogen atoms per molecule and a catalyst which promotes the addition of Si-bonded hydrogen to the vinyl groups.

11. The composition of claim 10, wherein the organopolysiloxane containing at least three Si-bonded hydrogen atoms per molecule is present in an amount of from 0.5 to 20 percent by weight based on the weight of the organopolysiloxanes.

12. A process for preparing the composition of claim 1 which comprises polymerizing at a temperature of from 30° to 70° C., at least two monomers having aliphatic unsaturation consisting of ethylene and vinyl acetate in the presence of a diorganopolysiloxane and free radical initiators, in which vinyl acetate is present in an amount of from 55 to 75 percent by weight based on the weight of vinyl acetate and diorganopolysiloxane and the total volume of vinyl acetate and diorganopolysiloxane does not exceed 60 percent of the volume of the polymerization device and the ethylene is present at a pressure of from 40 to 70 bar.

13. The process of claim 12, wherein monomers other than ethylene and vinyl acetate which are capable of being polymerized in the presence of free radical initiators are present in an amount of up to 5 percent by weight based on the weight of the vinyl acetate.

* * * * *